US007226113B2

(12) United States Patent
Dreier et al.

(10) Patent No.: US 7,226,113 B2
(45) Date of Patent: Jun. 5, 2007

(54) ARMREST INSERT AND CORRESPONDING ASSEMBLY FOR A VEHICLE

(75) Inventors: Mark Dreier, Toledo, OH (US); Dennis Surdu, Canton, MI (US); Robert Ender, Saline, MI (US); Charles E. Roe, Macomb Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/905,340

(22) Filed: Dec. 29, 2004

(65) Prior Publication Data

US 2006/0138802 A1 Jun. 29, 2006

(51) Int. Cl.
*B60J 5/00* (2006.01)

(52) U.S. Cl. ...................................... 296/153; 296/1.08

(58) Field of Classification Search ................ 296/153, 296/1.08

See application file for complete search history.

(56) References Cited

U.S. PATENT DOCUMENTS

| | | | | | |
|---|---|---|---|---|---|
| 1,247,547 | A | * | 11/1917 | Eune | 297/411.23 |
| 1,426,787 | A | * | 8/1922 | Spencer | 297/411.22 |
| 1,742,447 | A | * | 1/1930 | McKeag | 296/153 |
| 4,456,644 | A | * | 6/1984 | Janz et al. | 428/158 |
| 4,869,543 | A | | 9/1989 | Grimes | |
| 4,929,017 | A | * | 5/1990 | Lilienthal et al. | 296/153 |
| 5,010,996 | A | | 4/1991 | Washburn | |
| 5,275,779 | A | | 1/1994 | Marfilius et al. | |
| 5,290,087 | A | | 3/1994 | Spykerman | |
| 5,395,161 | A | | 3/1995 | Spykerman et al. | |
| 5,445,430 | A | * | 8/1995 | Nichols | 296/153 |
| 5,464,272 | A | | 11/1995 | Spykerman et al. | |
| 5,527,084 | A | * | 6/1996 | Scherf | 296/153 |
| 5,573,272 | A | * | 11/1996 | Teshima | 280/751 |
| 5,921,610 | A | * | 7/1999 | Grimes | 296/153 |
| 6,213,538 | B1 | | 4/2001 | Scheidmantel et al. | |
| 6,248,205 | B1 | | 6/2001 | Scheidmantel et al. | |
| 7,108,312 | B2 | * | 9/2006 | Cowelchuk et al. | 296/146.7 |
| 2004/0108740 | A1 | * | 6/2004 | Maierholzner | 296/1.09 |
| 2004/0178660 | A1 | * | 9/2004 | Dry | 296/153 |
| 2005/0200161 | A1 | * | 9/2005 | Reed et al. | 296/153 |

FOREIGN PATENT DOCUMENTS

JP 2000-85434 * 3/2000

* cited by examiner

*Primary Examiner*—Dennis H. Pedder
(74) *Attorney, Agent, or Firm*—Earl J. LaFontaine, Esq.

(57) ABSTRACT

An armrest (54) for a vehicle (52) includes a substrate (70), an armrest casing (62), and an insert (56). The armrest casing (62) has an upper portion (81) with an arm-resting surface (83). The insert (56) includes a non-foam material and resides between the substrate (70) and the upper portion (81). The armrest casing (62) covers a portion of the substrate (70) and the insert (56).

18 Claims, 3 Drawing Sheets

ARMREST INSERT AND CORRESPONDING ASSEMBLY FOR A VEHICLE

TECHNICAL FIELD

The present invention relates to automotive interior trim and more particularly, to an armrest assembly and to components thereof.

BACKGROUND OF THE INVENTION

Armrests are incorporated into vehicles for ergonomic reasons and comfort and convenience of both drivers and passengers. Armrests may be attached to or integrally formed as part of an interior door panel, a seat assembly, or a center console. Some armrests may be stationary, fixed, collapsed, extended, or rotated depending on the mounting location and the system that it is incorporated within.

A traditional armrest assembly consists of four main components, a main substrate, a foam backplate, an armrest casing, and a foam element. The main substrate provides support and structure to the armrest. The foam backplate is coupled to the main substrate and the combination thereof is inserted into an armrest casing. The foam element resides within a cavity formed by the coupling of the substrate, the backplate, and the casing. The foam element provides flexibility, energy absorption, and occupant comfort.

A common process utilized to manufacture and assemble a vehicle armrest, such as that contained within or on a door assembly, includes five main tasks. The process begins with the injection molding of the main substrate. A plastic material is injected into a mold, which is then cured to form the main substrate. The second task includes the "over molding" of the armrest casing, often formed of a vinyl material, over the main substrate. Following the over molding of the armrest casing, the foam backplate is attached or fastened to the substrate. The fourth task includes the injection of expandable foam through the backplate into the cavity between the substrate, the casing, and the backplate. The foam expands within the cavity and has a resulting exterior shape that is substantially similar or identical to the internal shape of the cavity. Finally, the foam is cured to form the finished armrest.

Although the foam element can provide the desired characteristics for an armrest, such as flexibility and energy absorption, the process used to form and cure the foam element is time consuming and costly. The amount of time required to inject and allow the foam element to cure can be as much as several minutes. In addition, the type of material utilized to form the foam element can also be costly.

As it is known in the art, it is desirable to minimize manufacturing time and costs. Thus, there exists a need for an improved armrest and process of forming an armrest that reduces manufacturing and assembly time and costs, as well as material costs.

SUMMARY OF THE INVENTION

In one embodiment of the present invention, an armrest for a vehicle is provided. The armrest includes a substrate, an armrest casing, and an insert. The armrest casing has an upper portion with an arm-resting surface. The insert includes a non-foam material and resides between the substrate and the upper portion. The armrest casing covers a portion of the substrate and the insert.

The embodiments of the present invention provide several advantages. One such advantage is the provision of an armrest having an insert that is formed of a non-foam material. Since the insert is formed of a non-foam material, the insert may be formed using a quick forming and curing process, such as injection molding or the like. The insert is thus quickly formed and cured, which reduces manufacturing time and costs.

Another advantage provided by an embodiment of the present invention is the provision of an armrest insert that may be prefabricated prior to assembly of the armrest. This further reduces manufacturing time and costs, as well as reducing armrest assembly time and costs. The prefabrication of the insert also minimizes the number of components within the armrest, by eliminating the need for a foam backplate.

Additionally, another advantage provided by an embodiment of the present invention is the provision of a non-foam insert that may be prefabricated quickly in various shapes, sizes, and having various degrees or levels of material physical flexibility thus, providing increased design flexibility. The ability to provide various levels of material physical flexibility provides a desired level of comfort, energy absorption, and overall performance for a particular application.

Furthermore, another embodiment of the present invention provides an armrest insert that may be easily placed within an armrest assembly to support an armrest casing, without use of fasteners or special tools or equipment. Again providing manufacturing and assembly ease.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

While the present invention is described primarily with respect to an armrest for door assembly of an automotive vehicle, the present invention may be adapted to various armrests. The present invention may be applied to ground-based vehicles, to aeronautical vehicles, to watercraft, and to other vehicle and non-vehicle applications. The present invention may be applied to armrests included in a console, a center console, an interior vehicle panel, an interior panel wheel well cover, a door panel, or to other armrests known in the art.

In the following description, various operating parameters and components are described for one constructed embodiment. These specific parameters and components are included as examples and are not meant to be limiting.

Figure 1:
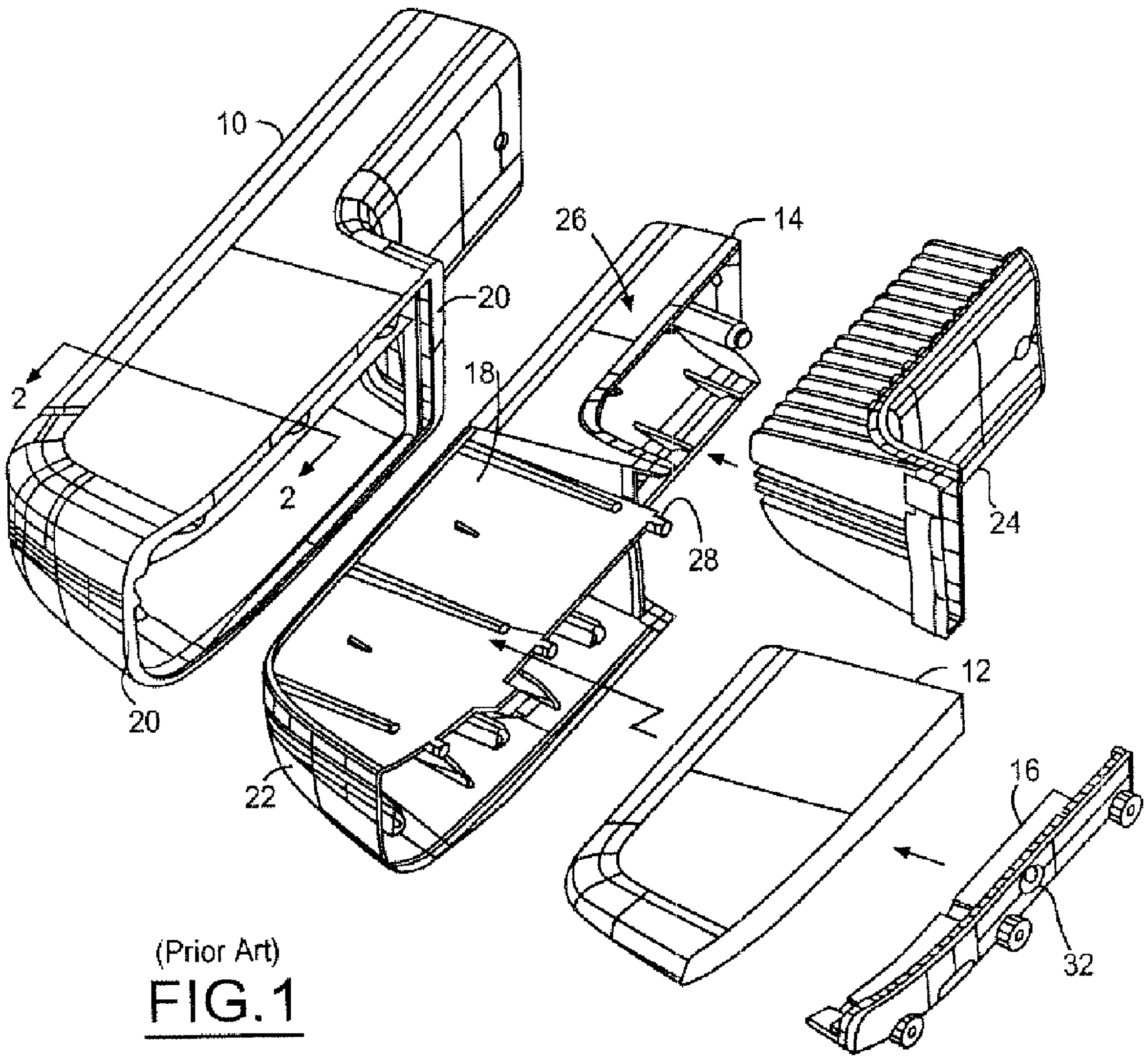
FIG. 1 is a traditional exploded perspective view of an armrest assembly incorporating an injected foam insert.
Figure 2:
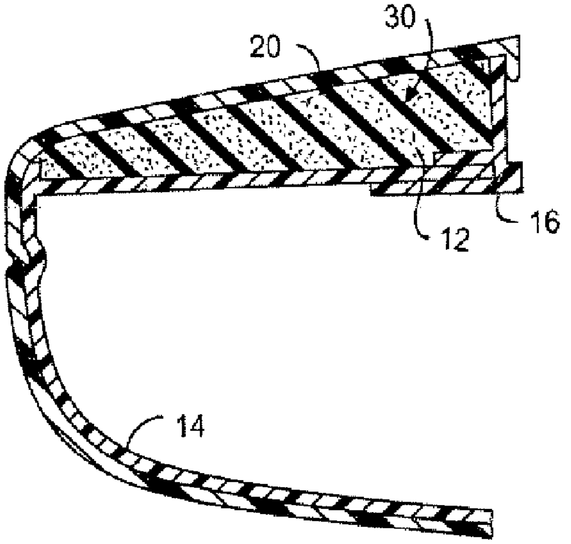
FIG. 2 is a cross-sectional view of the armrest assembly of FIG. 1.

Referring now to FIGS. 1 and 2, a traditional exploded perspective view and a cross-sectional view of an armrest assembly 10 are shown incorporating an injected foam insert 12. The armrest assembly 10 includes the insert 12, the substrate 14, and a foam backplate 16. The insert 12 is formed of a foam material and resides on a top surface 18 of the substrate 14. The insert also resides between the top surface 18 and an armrest casing 20. The armrest casing covers interior protruding and exterior surfaces of the substrate 22. A reinforcement member 24 is coupled to the substrate 22 to provided added strength within a handle region 26 of the armrest assembly 10.

During manufacturing and assembly of the armrest assembly 10 the armrest casing 20 is formed over the substrate 14. The foam backplate 16 is coupled to the upper exterior side 28 of the substrate 14. The substrate 14, the armrest casing 20, and the foam backplate 16 form a cavity, indicated by arrow 30. Expandable foam is injected into the cavity 30 through an injection point 32. The foam expands within and fills the cavity 30. Although the insert 12 is shown within the exploded view of FIG. 1, similar to the separately formed substrate 14 and foam backplate 16, the insert 12 is injected into the cavity 30 as stated and is formed subsequent to the coupling of the foam backplate 16 to the substrate 14.

The time to inject and allow the foam insert 12 to expand and cure can require several minutes. Also, when polyurethane foam is utilized the reagents to form the foam are susceptible to environmental parameter changes, such as atmospheric moisture (humidity), temperature, and pressure changes. These parameter changes can have substantially adverse affect upon the consistency of the resulting foam insert from day to day or even batch to batch. Furthermore, according to conventional methods, after the polyurethane foam has been injected and cured, copious quantities of scrap remain, which require additional time and labor to clean up, which adds to the cost of production. Moreover, the disposal of the scraps and the byproducts from synthesizing polyurethanes can be costly.

In addition, due to the complexity, smell, and messiness of preparing the polyurethane foams or any foams in general, it is typically not practical for the armrest assembly to be produced in one location as the preparation of the foam requires an additional, separate work station, which further adds to costs of manufacturing. What is more, many foam inserts are not recyclable and thus the armrest assemblies are not recyclable when a corresponding automotive vehicle is scrapped. Thus, the injection of some urethane foams can be prohibitive.

The present invention overcomes these traditional armrest assembly associated disadvantages and limitations. This will become evident in view of the following description and accompanying figures.

Figure 3:
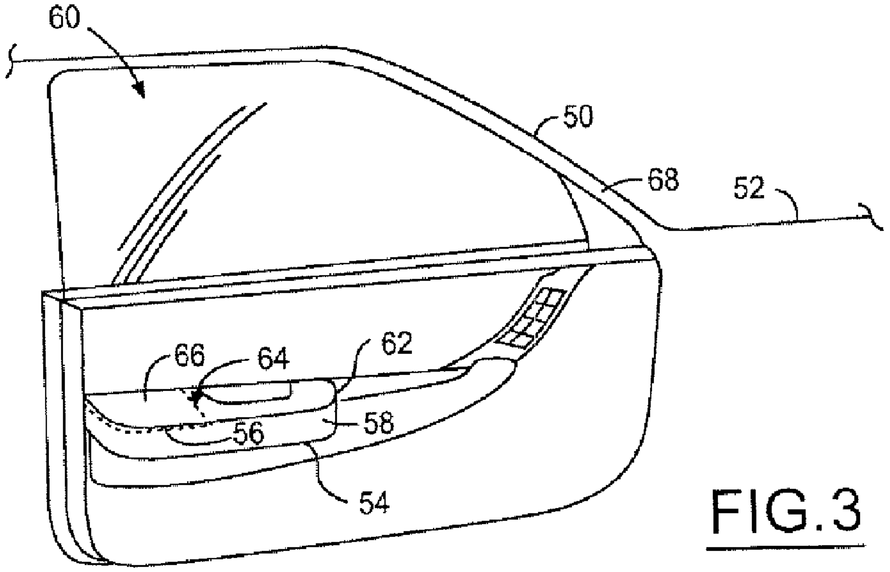
FIG. 3 is a perspective view of a door assembly incorporating an armrest assembly in accordance with an embodiment of the present invention.

Referring now to FIG. 3, a perspective view of a door assembly 50 for a vehicle 52 is shown incorporating an armrest or an armrest assembly 54 in accordance with an embodiment of the present invention. The armrest assembly 54 includes an insert 56, which is formed at least partially of a non-foam material. The armrest assembly 54 includes a main body 58, which protrudes within the interior 60 of the vehicle 12. An armrest casing 62 resides over the armrest assembly 54 and has an upper portion 64 with an arm-resting surface 66.

Although the armrest assembly 54 is shown as part of a door assembly and coupled to a door structure 68, the armrest assembly 54 may be part of or coupled to other vehicle interior systems, structures, and panels, such as a center console structure, a seat system structure, and a rear interior panel.

Figure 4:
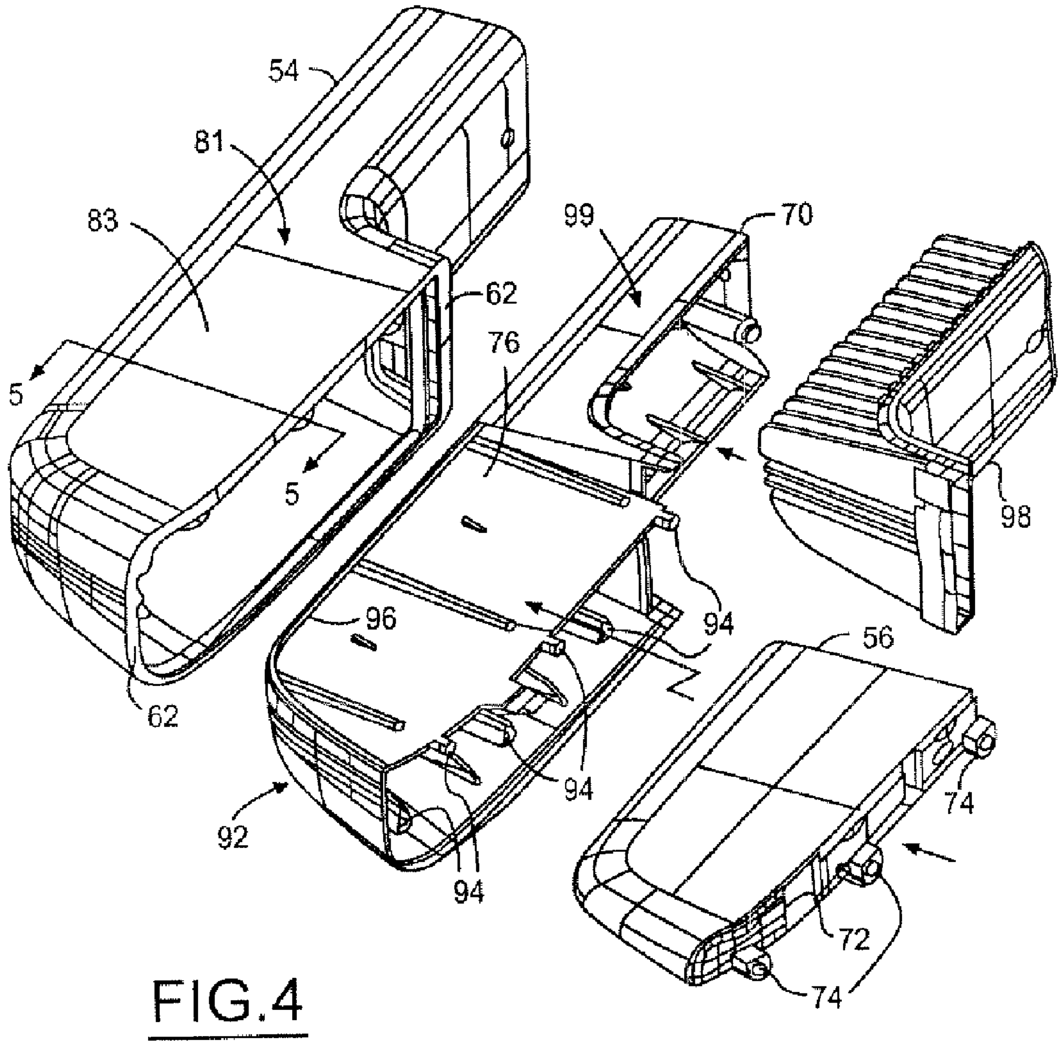
FIG. 4 is an exploded perspective view of an armrest assembly incorporating an insert in accordance with an embodiment of the present invention.
Figure 5:
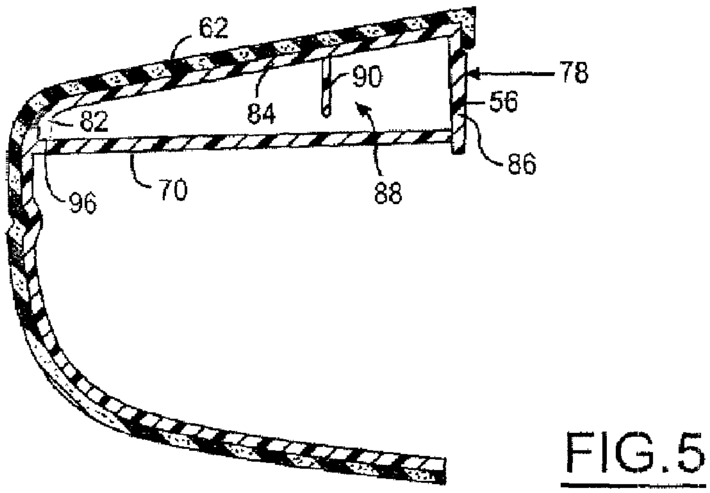
FIG. 5 is a cross-sectional view of the armrest assembly of FIG. 4.

Referring now to FIGS. 4 and 5, an exploded perspective view and a cross-sectional view of the armrest assembly 54 are shown incorporating the insert 56 in accordance with an embodiment of the present invention. The armrest assembly 54 includes the insert 56, the armrest casing 62, and the main substrate 70.

In one embodiment, the insert 56 is a single integrally formed component that is somewhat cup-shaped with an open bottom 72. The insert 56 may be formed in various sizes and shapes. The insert 56 may be formed to have a similar shape as a traditional combination of a foam insert and foam back plate, such as the combination of the insert 12 and the foam backplate 16.

The insert 56 resides substantially on the top surface 76 of the substrate 70 and within a pocket, indicated by arrow 78, between the top surface 76 and the armrest casing 62. The insert 56 provides support to the armrest casing 62. The insert 56 aids in maintaining the shape of the armrest casing 62 and in so doing maintaining the casing 62 in a taught state. The insert 56 may have any number of attachment passages 74 such as, for example, the passage of fasteners therethrough.

The insert 56 includes an interior-supporting member 82, a top-supporting member 84, and an exterior member 86. The interior-supporting member 82, and the top-supporting member 84 support the armrest casing 62. The top-supporting member 84 and the exterior member 86 "closes-up" the pocket 78 and may be coupled to the door structure 68. In closing the pocket 78 the members 84 and 86 create an air chamber 88, which may be utilized as a dampener to absorb energy exerted on the armrest assembly 54. A center hanging member 90 may be coupled to and limit the vertical displacement of the top-supporting member 84. The center member 90 may also increase rigidity of the insert 56. Any number of center members may be utilized.

As stated, the insert 56 is formed at least partially of a non-foam material. The insert 56 may be formed of any thermoplastic material and any number of material combinations. In one example embodiment, the insert 56 is formed entirely of a non-foam material, such as polypropylene, polycarbonate, or acrylonitrile-butadiene-styrene (ABS). The materials of the insert 56 may be modified to provide varying levels of flexibility and energy absorption. For example, materials having a lower durometer may be utilized to provide a "spongier", softer, or "springier" feel and response characteristic, whereas materials having a higher durometer may be utilized to provide a stiffer, harder, or less forgiving feel and response characteristic.

The armrest casing 62 includes an upper portion 81 with an arm-resting surface 83. The armrest casing 62 covers the protruding interior portion 92 of the substrate 70, as well as the interior-supporting member 82 and the top-supporting member 84. The armrest casing 62 may be formed utilizing methods known in the art and formed of various materials. The armrest casing 62 may be formed of plastic, vinyl, leather, cloth, or other armrest covering material. The armrest casing 62 may be formed of polyvinyl chloride or other thermoplastic polyolefin-based elastomers.

The substrate 70 provides structural support and shape for the armrest assembly 54. The substrate 70 is a single rigid molded component. The substrate 70 may be formed of various thermoplastic materials and any combination thereof. The substrate 70 may be formed of a polyolefin-based resin, polypropylene, polycarbonate, or ACS.

The substrate 70 includes door trim attachment elements or channels 94 and may include insert attachment elements, such as the outer edge guide 96. The channels 94 may allow for the passage of fasteners therethrough and may align with the passages 74. The interior-supporting member 82 rests against the outer edge guide 96. The substrate 70 may also include an additional guide or keying configuration for attaching the insert 56 to the substrate 70 for proper and desired orientation of the insert 56 relative to the substrate 70. Although there are a specific number of attachment elements shown, any number may be utilized.

The armrest assembly 54 may also include a reinforcement member 98 for added strength and rigidity in areas, such as in a door handle region 99, where such added strength is desired. The reinforcement member 98 may also be formed of various materials including those mentioned above with respect to the substrate 70.

Figure 6:
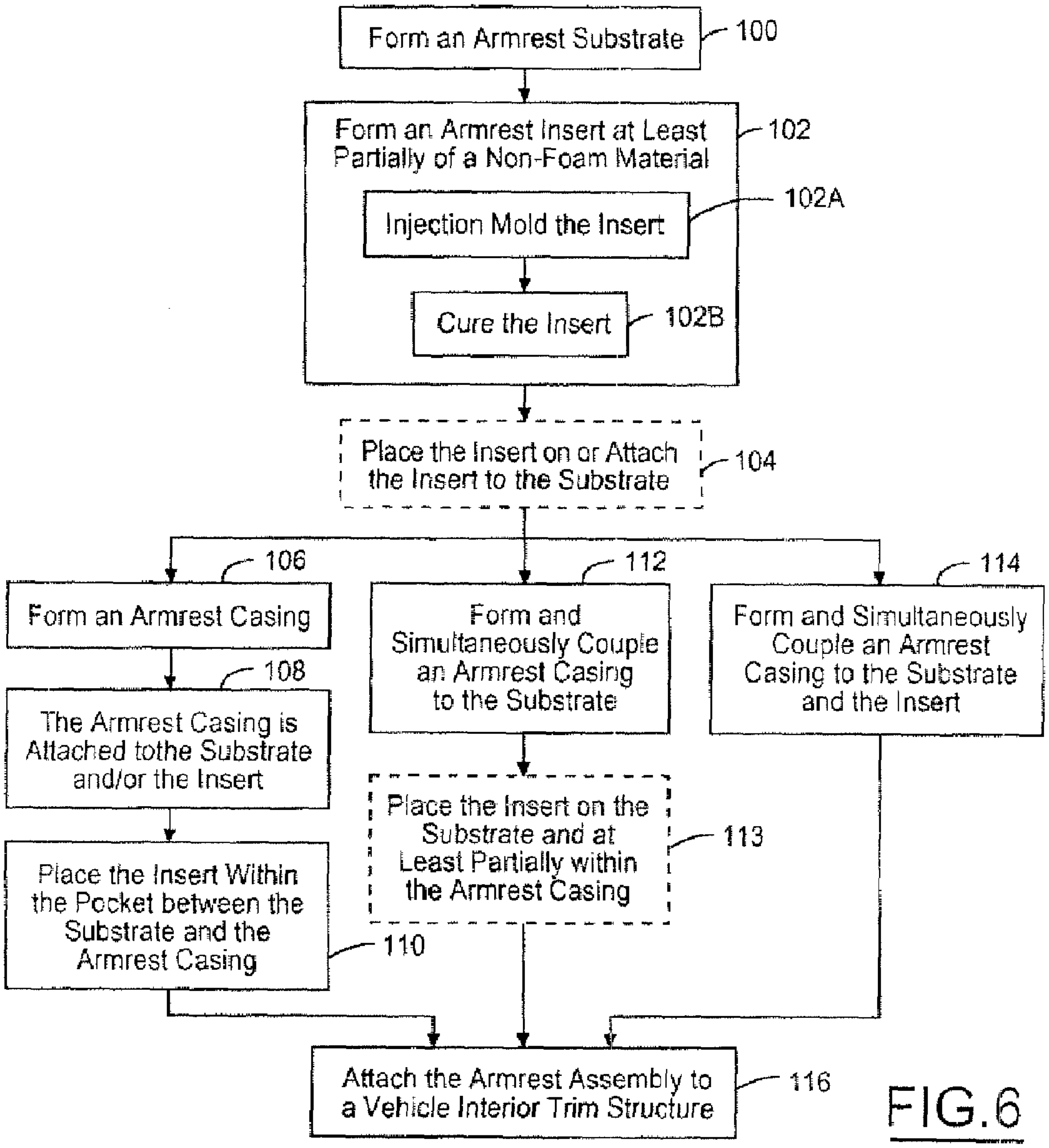
FIG. 6 is a method of manufacturing and assembling an armrest assembly in accordance with an embodiment of the present invention.

Referring now to FIG. 6, a method of manufacturing and assembling the armrest assembly 54 in accordance with an embodiment of the present invention is shown.

In step 100, the substrate 70 is formed. The substrate 70 may be formed using conventional methods known in the art. The substrate 70 may, for example, be injection molded.

In step 102, the insert 56 is formed. The insert 56 is formed separately and externally from the substrate 70 and the armrest casing 62. The insert 56 is formed at least to some extent with a non-foam material. In step 102A, the insert 56 may be injection molded or formed using some other method known in the art. In step 102B, the insert 56 is cured. When the insert 56 is injection molded, as is known in the art, the cure time is quick, typically within 2–3 seconds. The insert 56 is also cured separately and externally from the substrate 70 and the armrest casing 62.

In step 104, the insert 56 is placed on or attached to the substrate 70. In the example embodiment shown, the insert 56 is placed on or attached to the top surface 76. The insert 56 may be coupled to the top surface 76 using attachment mechanisms known in the art, such as guides, clips, fasteners, and adhesives.

In step 106, the armrest casing 62 is formed. The armrest casing 62 is formed to have the upper portion 81 with the arm-resting surface 83. The armrest casing 62 is formed separate from the insert 56 and the substrate 70, also using methods known in the art. In step 108, the armrest casing 62 is applied over or attached to the insert 56 and/or the substrate 70. The substrate 70 and the insert 56 may be placed within the armrest casing 62. In step 110, the insert 56 is placed within or inserted into the pocket 78 between the substrate 70 and the upper portion 81.

In step 112, the armrest casing 62 is formed and coupled to the substrate 70. A temporary mold may be placed on the substrate 70 that is similar in size and shape as the insert 56. The temporary mold may be formed of steel or other suitable material for the molding of the armrest casing 62 thereon. The armrest casing 62 is "over molded" over or onto the temporary mold and the substrate 70.

In step 113, the insert 56 may be placed on or attached to the substrate 70 and inserted in the armrest casing 62. Similar to step 104, the insert 56 may be placed on or attached to the top surface 76. The insert 56 may be coupled to the top surface 76 using attachment mechanisms as stated above.

In step 114, the armrest casing 62 is formed and coupled to the substrate 70. The armrest casing 62 is over molded onto the insert 56 and the substrate 70. This is unlike traditional methods where an armrest casing is over molded onto a substrate followed by injection of a foam material between the armrest casing and the substrate.

In step 116, the armrest assembly 54 may be coupled to an interior trim structure, such as the door structure 68.

The above-described steps are meant to be illustrative examples; the steps may be performed sequentially, synchronously, simultaneously, or in a different order depending upon the application.

The present invention provides an armrest assembly that incorporates an armrest insert formed of a non-foam material. The use of a non-foam material provides decreased material costs of an armrest insert. The insert may be formed separate from the armrest assembly and simplifies manufacturing and assembly steps and minimizes manufacturing and assembly time and costs. The present invention provides such advantages with reduced labor. The present invention also provides an armrest with desired performance characteristics, due to the flexible nature of the insert.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An armrest for a vehicle comprising:

a substrate configured to coupled and be fixed to an interior structure of the vehicle;

an armrest casing having an upper portion with an arm-resting surface; and a flexible insert at least partially comprising a non-foam material formed of a thermoplastic material, residing vertically between said substrate and said upper portion when the armrest is mounted within the vehicle, extending adjacent to and along said arm-resting surface, and supporting said arm-resting surface, said flexible insert resides within, is coupled to, and supports said armrest casing;

said armrest casing directly covering at least a portion of said substrate and said insert.

2. An armrest as in claim 1 wherein said substrate is a rigid member that supports said armrest casing and said insert.

3. An armrest as in claim 1 wherein said armrest casing is formed of at least one material selected from vinyl, polyolefin, leather, and plastic.

4. An armrest as in claim 1 wherein said armrest casing covers a significant portion of said substrate and said insert.

5. An armrest as in claim 1 wherein said insert is flexible to normal vertically applied occupant arm pressure.

6. An armrest as in claim 1 wherein said insert is injection molded.

7. An armrest as in claim 1 wherein said insert is a single component.

8. An armrest as in claim 1 wherein said insert directly resides within, is coupled to, and is vertically bound by and shaped as said armrest casing and said substrate.

9. An armrest as in claim 1 wherein said insert aids in maintaining exterior shape and form of said armrest casing.

10. An armrest as in claim 1 wherein said insert maintains said armrest casing in a taught state.

11. A vehicle interior trim assembly for a vehicle comprising:

an interior trim structure of the vehicle; and an armrest coupled to said interior trim structure and comprising;

a substrate comprising at least one interior trim attachment element for attachment to said interior trim structure;

an armrest casing having an upper portion with an arm-resting surface; and only one flexible insert at least partially comprising a non-foam material formed of a thermoplastic material and resting vertically on said substrate and between said substrate and said armrest casing, said flexible insert resides within, is coupled to, and supports said armrest casing;

said armrest casing covering at least a portion of said substrate and said insert.

12. An assembly as in claim 11 wherein said interior trim structure comprises a door structure.

13. An armrest as in claim 1 comprising an air chamber defined by said insert and said substrate and dampening pressure vertically applied on said arm-resting surface.

14. An armrest as in claim 1 wherein said insert comprises:

an interior-supporting member resting on said substrate, a top-supporting member supporting said arm-resting surface; and an exterior member closing off an air chamber between said insert and said substrate.

15. An armrest as in claim 1 wherein said insert comprises a center member that limits vertical displacement of said arm-resting surface due to occupant arm pressure thereon.

16. An armrest as in claim 1 wherein said insert comprises a member that extends adjacent to and along said arm-resting surface.

17. A vehicle interior door trim assembly for a vehicle comprising;

an interior door trim structure configured to attach to a door of the vehicle; and an armrest comprising;

a substrate coupled to and extending away from said interior door trim structure;

an armrest casing having an upper portion with an arm-resting surface; and a flexible insert at least partially comprising a non-foam material formed of a thermoplastic material, resting on said substrate, extending along and shaped as said arm-resting surface, and in said armrest casing, said flexible insert resides within, is coupled to, and supports said armrest casing;

said armrest casing covering at least a portion of said substrate and said insert.

18. An assembly as in claim 17 wherein said substrate comprises a door handle region.

* * * * *